United States Patent
Knoedler et al.

(10) Patent No.: US 12,510,675 B2
(45) Date of Patent: Dec. 30, 2025

(54) METHOD FOR DETERMINING NAVIGATION DATA

(71) Applicant: Robert Bosch GmbH, Stuttgart (DE)

(72) Inventors: Kosmas Knoedler, Bad Wimpfen (DE); Marco Limberger, Appenweier-Urloffen (DE); Zhibo Wen, Abstatt (DE); Thomas Speth, Denkendorf (DE)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 18/245,667

(22) PCT Filed: Sep. 20, 2021

(86) PCT No.: PCT/EP2021/075751
§ 371 (c)(1),
(2) Date: Mar. 16, 2023

(87) PCT Pub. No.: WO2022/063714
PCT Pub. Date: Mar. 31, 2022

(65) Prior Publication Data
US 2024/0012160 A1 Jan. 11, 2024

(30) Foreign Application Priority Data
Sep. 24, 2020 (DE) .................. 10 2020 212 028.5

(51) Int. Cl.
*G01S 19/41* (2010.01)
*G01S 19/47* (2010.01)
(52) U.S. Cl.
CPC .............. *G01S 19/41* (2013.01); *G01S 19/47* (2013.01)

(58) Field of Classification Search
CPC .......... G01S 19/07; G01S 19/40; G01S 19/41; G01S 19/47
See application file for complete search history.

(56) References Cited

U.S. PATENT DOCUMENTS

| | | | | |
|---|---|---|---|---|
| 5,884,220 A | * | 3/1999 | Farmer | G01S 19/41 342/357.44 |
| 6,023,239 A | * | 2/2000 | Kovach | G01S 5/009 342/357.44 |

(Continued)

FOREIGN PATENT DOCUMENTS

| | | |
|---|---|---|
| EP | 0 814 345 A2 | 12/1997 |
| EP | 3 667 234 A1 | 6/2020 |
| WO | 2020/039659 A1 | 2/2020 |

OTHER PUBLICATIONS

International Search Report corresponding to PCT Application No. PCT/EP2021/075751, mailed Mar. 21, 2022 (German and English language document) (7 pages).

*Primary Examiner* — Tyler J Lee
(74) *Attorney, Agent, or Firm* — Maginot, Moore & Beck LLP

(57) ABSTRACT

A method for determining navigation data by way of a GNSS localization device is disclosed. The method includes a) obtaining GNSS satellite signals from GNSS satellites; b) receiving at least two alternative GNSS correction data from at least two different correction data sources; c) analyzing the alternative GNSS correction data and determining the validated correction data; and d) determining navigation data from received GNSS satellite signals and validated correction data.

11 Claims, 1 Drawing Sheet

(56) References Cited

U.S. PATENT DOCUMENTS

| | | | | |
|---|---|---|---|---|
| 6,061,632 | A * | 5/2000 | Dreier | G01S 19/44 |
| | | | | 701/470 |
| 6,067,484 | A * | 5/2000 | Rowson | G05D 1/0676 |
| | | | | 701/16 |
| 6,415,229 | B1 | 7/2002 | Diekhans | |
| 6,531,981 | B1 * | 3/2003 | Fuller | G01S 19/071 |
| | | | | 701/470 |
| 6,862,526 | B2 * | 3/2005 | Robbins | G01S 19/071 |
| | | | | 340/995.25 |
| 7,158,885 | B1 * | 1/2007 | Janky | H04K 1/00 |
| | | | | 701/484 |
| 7,471,239 | B1 * | 12/2008 | Huang | G01S 19/41 |
| | | | | 342/357.24 |
| 7,511,661 | B2 * | 3/2009 | Hatch | G01S 19/41 |
| | | | | 342/357.31 |
| 8,073,619 | B2 * | 12/2011 | Hattori | G01S 19/52 |
| | | | | 701/445 |
| 9,645,241 | B1 | 5/2017 | Pighin | |
| 10,895,647 | B2 * | 1/2021 | Jokinen | G01S 19/072 |
| 2008/0316092 | A1 * | 12/2008 | Huang | G01S 19/41 |
| | | | | 342/357.24 |
| 2009/0043435 | A1 * | 2/2009 | Kane | B61L 25/025 |
| | | | | 701/19 |
| 2009/0073036 | A1 * | 3/2009 | Huang | G01S 19/41 |
| | | | | 342/357.24 |
| 2009/0121927 | A1 * | 5/2009 | Moshfeghi | G01S 19/22 |
| | | | | 342/357.44 |
| 2012/0286991 | A1 * | 11/2012 | Chen | G01S 19/32 |
| | | | | 342/357.23 |
| 2014/0002300 | A1 * | 1/2014 | Leandro | G01S 19/04 |
| | | | | 342/357.27 |
| 2016/0377730 | A1 * | 12/2016 | Drescher | G01S 19/40 |
| | | | | 342/357.23 |
| 2017/0219715 | A1 * | 8/2017 | Ashjaee | G01S 19/09 |
| 2018/0321387 | A1 * | 11/2018 | Takahashi | G01S 19/07 |
| 2019/0271784 | A1 * | 9/2019 | Teigland | G01S 19/426 |
| 2020/0209406 | A1 * | 7/2020 | Lin | G01S 19/40 |

* cited by examiner

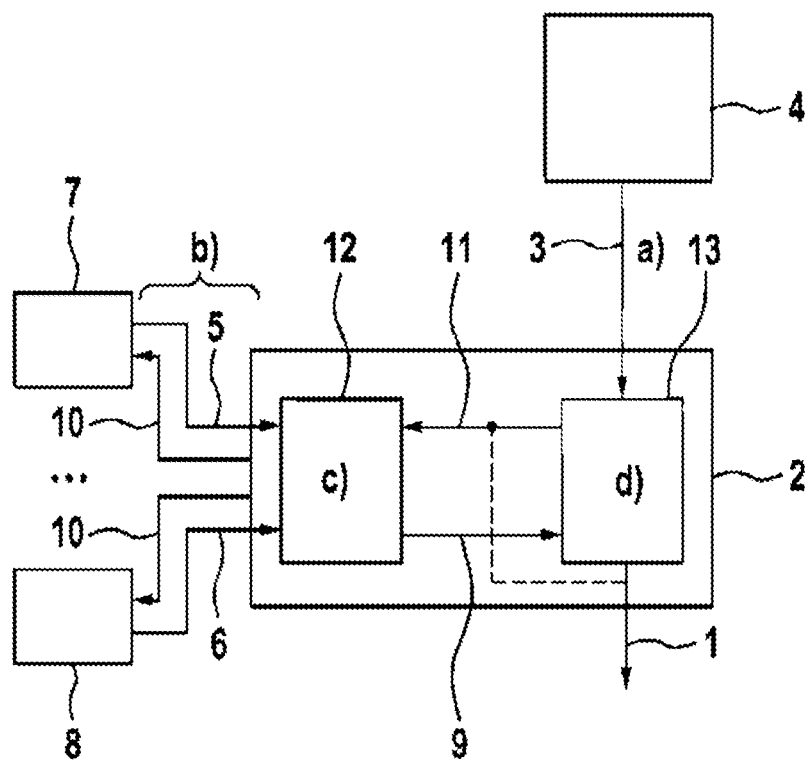

METHOD FOR DETERMINING NAVIGATION DATA

This application is a 35 U.S.C. § 371 National Stage Application of PCT/EP2021/075751, filed on Sep. 20, 2021, which claims the benefit of priority to Serial No. DE 10 2020 212 028.5, filed on Sep. 24, 2020 in Germany, the disclosures of which are incorporated herein by reference in their entirety.

BACKGROUND

The use of GNSS correction data to precisely obtain navigation data (primarily for determining navigation information, for example GNSS-based position determinations) is a common method. Such data are, for example, used to correct uncertainties in the position determination as a result of atmospheric interference in the GNSS signals and so forth. Such correction data are usually made available by special service providers. Such service providers transmit the correction data to a GNSS localization device optionally at regularly recurring times or upon request.

In particular in the automotive sector, the determination of highly accurate navigation data is becoming increasingly important. The use of GNSS correction data is therefore also gaining in importance. In light of this, a method for determining a position using GNSS correction data is to be proposed.

SUMMARY

Described herein is a method for determining navigation data by way of a GNSS localization device, comprising:
a) obtaining GNSS satellite signals from GNSS satellites;
b) receiving at least two alternative GNSS correction data from at least two different correction data sources;
c) analyzing the alternative GNSS correction data and determining validated correction data; and
d) determining navigation data from obtained GNSS satellite signals and validated correction data.

The GNSS localization device described herein is preferably part of a sensor for determining navigation data, which, in addition to GNSS satellite signals, may optionally also utilize other data to determine navigation data, e.g., data of a surroundings sensor system, stored map data, data of an inertial sensor system or similar data.

The GNSS satellite signals obtained in step a) are preferably received from GNSS satellites by way of a dedicated antenna and a GNSS localization device. GNSS signals include the carrier phase and pseudo-range observations as well as the modulated navigation data.

Correction data sources that provide correction data are typically so-called correction data providers that make correction data available. In conventional models, the service for providing correction data is booked permanently (usually for the intended service life of the GNSS localization device) by the manufacturer/provider of the respective GNSS localization device. A particularity of the method described herein is that in step b), alternative correction data are received from two different correction data sources. The different correction data sources are preferably two different correction data providers, each providing correction data independently of one another. The described method can thus preferably be practiced if the provider/manufacturer of the respective GNSS localization device (with which the described method is carried out) has corresponding contracts/agreements with different correction data providers so that these correction data are available.

In the analysis and validation of the correction data in step c), different methods may be used to determine validated correction data from the available alternative correction data.

The determination of the navigation data is the goal of the described method. This determination is made in step d). By using the validated correction data, a higher quality can be achieved in determining the navigation data, the higher quality here encompassing various aspects, such as high accuracy, integrity, and/or safety (both functional safety and data safety).

It is particularly advantageous if the alternative GNSS correction data received in step b) each include quality parameters, which are utilized in step c) to analyze the alternative GNSS correction data and to determine validated correction data.

Based on the quality parameters, a correction data source may signal directly if there might be issues with the respective correction data. Via quality parameters, the correction data source can thus transmit to the GNSS localization device the information that other correction data from another correction data source should rather be used to achieve a high quality of the determination of navigation data in step d). In this context, high quality means a high accuracy of the navigation data.

Time stamp information included in the correction data may also be processed in connection with quality parameters. Time stamp information may form the quality parameter itself or be part of the quality parameters. Time stamp information may also be included in the correction data in addition to the quality parameters. Time stamp information may, for example, include information on how current the correction data are. The more recent correction data may be determined/provided as validated correction data in step c).

In addition, it is advantageous if navigation data determined in step d) includes at least one of the following output parameters:
at least one position information;
at least one speed information Such output parameters should be as accurate as possible. This applies in particular if these navigation data are to be processed for applications of automated driving.

In addition, it is advantageous if, in step b), a correction data request comprising at least one request parameter is transmitted to the different correction data sources and the alternative GNSS correction data are transmitted by the correction data sources as a function of the correction data request and are received.

The correction data request includes the necessary information that the correction data source needs to purposefully provide the necessary correction data. This may, for example, be time and/or location information. The correction data source may then provide, as the correction data for this time and location, the correction data needed to determine navigation data at a high quality.

Moreover, it is advantageous if the correction data request includes at least one of the following request parameters:
time information;
position information.

It is also advantageous if, in step b), the correction data are received at least in encrypted form and are decrypted with a key stored in the GNSS localization device.

In that the correction data source provides correction data in encrypted form, the correction data source can ensure that the correction data is only processed by GNSS localization devices authorized to utilize the correction data. Particularly preferably, end-to-end encryption is applied, in which the correction data are encrypted at the correction data source with a public key provided by the GNSS localization device. The associated private key for decrypting the correction data is preferably stored in the GNSS localization device. The public key is preferably transmitted by the GNSS localization device to the correction data source with a correction data request. In embodiment variants, symmetric encryption methods are also possible, in which the same key is stored in the correction data source and in the GNSS localization device.

Moreover, it is advantageous if, in step b), the correction data are received with an electronic signature, and the electronic signature is verified in the analysis of the correction data in step c).

In order to verify the electronic signature of correction data, a public key is preferably stored in the GNSS localization device, with which key the authenticity of the electronic signature of the correction data can be verified. The verification of an electronic signature in particular makes it possible to determine that no falsified correction data are received here, which may have been manipulated, for example.

Preferably, a correction data request also includes an electronic signature, namely an electronic signature having a certificate from the GNSS localization device. Based on such an electronic signature, the correction data source can recognize the authenticity of the correction data request.

More particularly preferably, the correction data request is also encrypted. Primarily the correction data request may optionally contain sensitive information, such as the position of the GNSS localization device. Encryption can ensure that this sensitive information is used only by the correction data source to determine the correct correction data to be transmitted, and not by a third party for other purposes.

In embodiment variants, symmetric encryption may also be used for the encryption of the correction data request, in which encryption the same key is stored in the GNSS localization device and in the correction data source and is then used in the GNSS localization device for encrypting the correction data request and in the correction data source for decrypting the correction data request.

It is also advantageous if at least one of the following sub-steps is performed in step c) in order to determine validated correction data:
  plausibility check of the alternative correction data with respect to one another;
  applying an evaluation algorithm to decide which of the alternative correction data is used; and
  weighting alternative correction data with a weighting factor in order to decide to what extent correction data from a correction data source are to be considered.

In the plausibility check, the correction data are compared to one another. A plausibility check is in particular possible if more than two alternative correction data (e.g., three alternative correction data from three alternative correction data sources) are evaluated. Then, it can, for example, be checked which of the three alternative correction data deviates most from the other correction data. This correction data may then be discarded. As part of the plausibility check, a comparison of the different correction data against an expected standard data record can also be performed, which may optionally also be location- and time-dependent. In this way, it can be determined whether correction data are plausible.

An evaluation algorithm can use a variety of criteria. For example, one option is that correction data from a particular correction data source are preferred and provided as validated correction data depending on location and/or time. Different evaluation criteria can be used in the evaluation algorithm as part of the evaluation, for example the determination of a deviation from expected comparison values. An evaluation may, for example, be used to decide to use a particular correction data source.

When weighting correction data, it is possible to combine correction data from different correction data sources. A weighting factor may, for example, be established according to similar criteria as the criteria described above in connection with the evaluation algorithm (in particular time and/or location as criteria).

It is particularly preferred if an existing encryption and/or signature of correction data is also used in the plausibility check, evaluation and weighting of correction data. For example, it is possible to use encrypted and/or digitally signed correction data preferably or, optionally, also exclusively to generate the validated correction data in step c).

Moreover, it is advantageous if at least one of the following additional parameters is utilized in step c) to determine validated correction data:
  output parameters calculated in the GNSS localization device;
  transmission latency parameters of the data transmission of the correction data.

The additional parameters described herein are not contained in the correction data themselves. On the contrary, they are data originating from other sources. Calculated output parameters may correspond, in whole or in part, to the navigation data determined in step d).

Transmission latency parameters reflect if correction data transmission issues have occurred or occur and could cause the respective correction data to be falsified or could indicate that there may be difficulty in transmitting the correction data from the correction data source to the GNSS localization device without error.

Also described herein is a GNSS localization device configured to perform the described method.

The advantages and design features described in connection with the method can be transferred to the described GNSS localization device.

BRIEF DESCRIPTION OF THE DRAWINGS

The method as well as the GNSS localization device are explained in more detail below with reference to the FIGURE. The FIGURE shows:

FIG. 1: a described GNSS localization device.

DETAILED DESCRIPTION

FIG. 1 shows the GNSS localization device 2 to which navigation data 1 provides. The GNSS localization device 2 receives GNSS satellite data 3 from GNSS satellites 4 in order to determine the navigation data 1 therefrom. This preferably takes place in a GNSS module 13 of the GNSS localization device 2. For this purpose, the GNSS localization device 2 also processes validated correction data 9. The validated correction data 9 are determined from correction data 5, 6 determined from different correction data sources 7, 8. As an example, a first correction data source 7 for providing first correction data 5 and a second correction data source 8 for providing second correction data 6 are shown here. There may be further correction data sources. The correction data 5, 6 are preferably provided by the correction data sources 7, 8 in response to a correction data request 10 provided by the GNSS localization device 2. In order to determine the validated correction data 9 and to provide them to the GNSS module, a correction data module 12 is preferably provided in the GNSS localization device 2. From the GNSS module 13, the correction data module 12 may optionally receive output parameters 11, which are utilized to determine the validated correction data 9. Such output parameters 11 may optionally also be passed to the correction data sources 7, 8 in the form of the correction data request 10. The output parameters 11 passed to the correction data module 12 may also be part of the navigation data 1 provided by the GNSS localization device 2. In FIG. 1, the individual method steps a), b) and c) are associated with the respective components of GNSS localization device 2. Step a) relates to obtaining the GNSS satellite data 3. Step b) corresponds to receiving the correction data 5, 6 from the correction data sources 7, 8. Step c) is performed in the correction data module 12. Step d) is performed in the GNSS module 13.

The invention claimed is:

1. A method for determining navigation data by way of a GNSS localization device, comprising:
   a) obtaining GNSS satellite signals from GNSS satellites using the GNSS localization device that is included in an automobile;
   b) receiving at least two alternative GNSS correction data from at least two different correction data sources using the GNSS localization device;
   c) analyzing the alternative GNSS correction data and determining validated correction data using the GNSS localization device; and
   d) determining navigation data from obtained GNSS satellite signals and validated correction data using the GNSS localization device,
   wherein, in step b), a correction data request comprising at least one request parameter is transmitted from the GNSS localization device to each of the different correction data sources, and the alternative GNSS correction data are transmitted by each of the correction data sources to the GNSS localization device as a function of the correction data request,
   wherein the correction data request includes the following request parameters (i) time information, and (ii) position information,
   wherein the determined navigation data is used to control an automobile for automated driving of the automobile, and
   wherein the at least two different correction data sources are remote from the automobile and the GNSS localization device.

2. The method according to claim 1, wherein:
   the alternative GNSS correction data received in step b) each include quality parameters, and
   step c) includes utilizing the quality parameters to analyze the alternative GNSS correction data and to determine validated correction data.

3. The method according to claim 1, wherein the navigation data determined in step d) include at least one of the following output parameters:
   at least one position information; and
   at least one speed information.

4. The method according to claim 1, wherein, in step b), the correction data are received at least in encrypted form and are decrypted with a key stored in the GNSS localization device.

5. The method according to claim 1, wherein, in step b), the correction data are received with an electronic signature, and the electronic signature is verified in the analysis of the correction data in step c).

6. The method according to claim 1, wherein at least one of the following sub-steps is performed in step c) in order to determine validated correction data:
   plausibility check of the alternative correction data with respect to one another;
   applying an evaluation algorithm to decide which of the alternative correction data are used; and
   weighting of alternative correction data with a weighting factor in order to decide to what extent correction data from a correction data source are to be considered.

7. The method according to claim 1, wherein at least one of the following additional parameters is utilized in step c) to determine validated correction data:
   output parameters calculated in the GNSS localization device; and
   transmission latency parameters of the data transmission of the correction data.

8. A GNSS localization device configured to perform the method according to claim 1.

9. The method according to claim 1, wherein:
   the GNSS correction data are received by a correction data module of the GNSS localization device,
   the GNSS satellite signals are obtained by a GNSS module of the GNSS localization device.

10. The method according to claim 9, wherein the correction data module provides the validated correction data to the GNSS module.

11. The method according to claim 9, wherein:
    the GNSS module provides output parameters to the correction data module, and
    the output parameters include at least one position information and at least one speed information.

* * * * *